United States Patent [19]
Decker et al.

[11] Patent Number: 4,757,495
[45] Date of Patent: Jul. 12, 1988

[54] SPEECH AND DATA MULTIPLEXOR OPTIMIZED FOR USE OVER IMPAIRED AND BANDWIDTH RESTRICTED ANALOG CHANNELS

[75] Inventors: Dwight W. Decker, Cupertino; Payne Freret, Los Altos; Dirk Hughes-Hartogs, Morgan Hill; Mark B. Flowers, Mountain View; Frederick L. Mueller, Palo Alto, all of Calif.

[73] Assignee: Telebit Corporation, Mountain View, Calif.

[21] Appl. No.: 836,438

[22] Filed: Mar. 5, 1986

[51] Int. Cl.$^4$ .............................................. H04J 1/14
[52] U.S. Cl. ...................................... 370/76; 370/69.1
[58] Field of Search .................... 370/69.1, 76, 110.1; 375/98, 97, 5

[56] References Cited

U.S. PATENT DOCUMENTS

| | | | |
|---|---|---|---|
| 3,875,339 | 4/1975 | Gruen et al. | 370/76 |
| 4,379,947 | 4/1983 | Warner | 370/69.1 |
| 4,425,642 | 1/1984 | Moses et al. | 370/76 |
| 4,438,511 | 3/1984 | Baran | 370/60 |

*Primary Examiner*—Douglas W. Olms
*Assistant Examiner*—Wellington Chin
*Attorney, Agent, or Firm*—Donald C. Feix

[57] ABSTRACT

The present invention relates to an apparatus and method for the simultaneous transmission of analog speech and modulated data, such apparatus and method being optimized for use over impaired and bandwidth restricted analog channels, or digital representations of such channels. In each instance of use, an evaluation is made of the available channel bandwidth, with a frequency division multiplex scheme allocating a voice sub-band, with data transmission allocated to sub-bands above, below, or around, this selected voice sub-band. The speech and data sub-band allocations are made by the multiplexor in response to user input of either a requested speech quality, a requested data rate, or a value indicating the relative user weighting of speech quality and data rate. A multi-carrier multi-mode modulation scheme is employed for data transmission, with this scheme having the ability to fully utilize the remaining bandwidth, and further, being capable of adapting to the impairments most likely present on the fringes of bandwidth restricted analog channels. When the analog channel employed is the standard voice-grade telephone circuit, good speech quality simultaneously with 3000 bps data transmission may be expected. The further ability to automatically switch to full bandwidth data transmission when voice transmission is not being attempted is also provided.

37 Claims, 8 Drawing Sheets

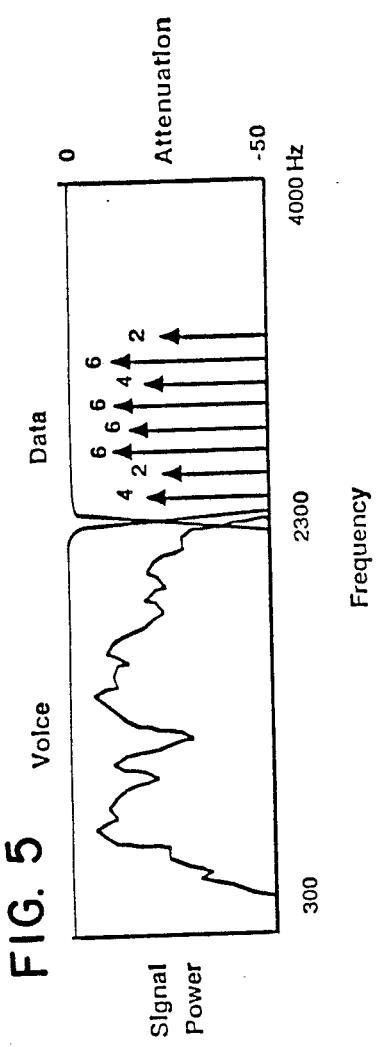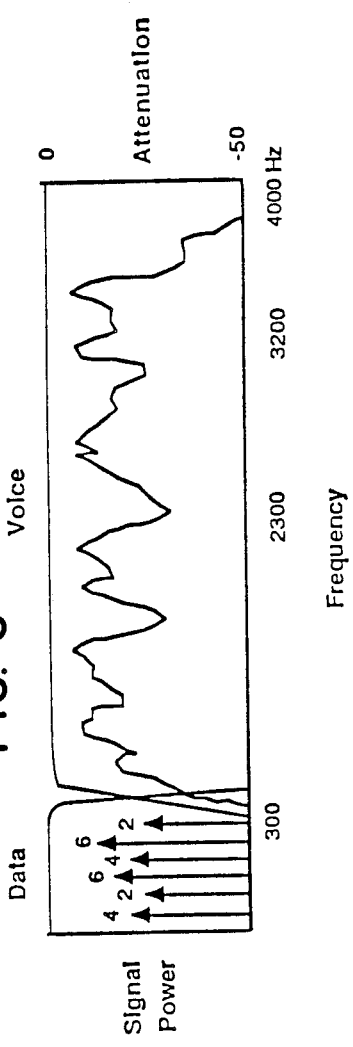

Parallel Architecture-High Band Data

SPEECH AND DATA MULTIPLEXOR OPTIMIZED FOR USE OVER IMPAIRED AND BANDWIDTH RESTRICTED ANALOG CHANNELS

FIELD OF THE INVENTION

The present invention relates to an apparatus and method for the simultaneous transmission of analog speech and modulated data, such apparatus and method being optimized (in the sense of achieving the highest reliable data transmission throughput rate) for use over impaired and bandwidth restricted analog channels, or digital representations of such channels.

BACKGROUND OF THE INVENTION

A frequency decomposition of normal speech will indicate components higher than 4000 Hz; however, the total energy in these components is substantially smaller than that found in those frequency components below 4000 Hz. For this reason it is common to consider, as will be done here, an analog channel with transmission bandwidth from 0–4000 to be unrestricted. The most common cause of bandwidth restriction is the application of filtering stages by analog transmission channel providers. This filtering is normally performed in the channel equipment before multiplexing channels onto an analog carrier using frequency division multiplexing techniques, or onto a digital carrier using time division multiplexing techniques. The result is frequency dependent attenuation in the high and low fringes of the 0–4000 Hz band with the positioning and steepness of the resulting channel roll-off behavior dependent on the channel provider's selection of filtering equipment and the number of multiplexing stages over the channel. A channel impairment that is a natural consequence of this filtering process is frequency dependent group delay, which causes differential delay distortion of the data signal, and which is most strongly exhibited in the filter roll-off frequency region. Another impairment common to analog channels is the induced power line and telephone signalling noise often present in the 0–300 Hz frequency band. The effect of analog channel impairment and bandwidth restriction has been to limit the data throughput performance of speech and data multiplexors of the prior art as is now discussed.

Existing means for the simultaneous transmission of speech and data over analog channels fall into several classes.

One class employs the silent intervals in speech for the data transmission, while another uses the speech itself as a carrier onto which data is modulated. Another approach is to superimpose the data signal on the voice signal, with the separation of each component from the transmission distorted composite signal performed by the receiver. Yet another approach is to distribute the data energy in a spread spectrum fashion that would prove inaudible to the listener.

The class of methods within which the present invention falls generally is the class which relates to the division in frequency of the available bandwidth, with speech and data signals assigned to separate frequency sub-bands.

In the prior art in this class, when the analog transmission channel is the local loop portion of the public telephone network, methods for data transmission well above the voice frequency band have been disclosed as in U.S. Pat. No. 4,302,629 issued to J. D. Foulkes et al. on Nov. 24, 1981. Such schemes require bandwidths well in excess of the 0–4000 Hz frequency range and hence these implementations are unsatisfactory over bandwidth restricted channels as presented by what are termed loaded local loops. These loops, which are generally over 18,000 feet in length, are circuits in which inductors, called loading coils, have been installed to improve frequency response in the 2200–3200 Hz range. Such loops severly attenuate frequencies above approximately 3700 Hz (Transmissions Systems for Communications, Bell Telephone Laboratories pp. 224–226) and comprise approximately 20 percent of all local loops in the United States public telephone network.

Another approach in the prior art is to employ the frequencies between 0 and 200 Hz and a single carrier modulation scheme to produce a 200–300 bps data transmission rate. A disadvantage of this method is that single carrier transmission is sensitive to the composite noise over the entire sub-band employed, and in this case power equipment induced 60 Hz and 180 Hz noise (*Bell System Technical Journal*, Vol. 63, No. 5, pp. 775–818) will cause signal distortion. This distortion limits the information carrying ability of the carrier and results in a relatively low data rate. A further disadvantage is that frequencies below 200 Hz are either unavailable or severely attenuated on long distance public switched telephone network links (BSTJ Vol. 63, No. 5, pp. 775–818).

A similar approach in the prior art is disclosed in U.S. Pat. No 4,011,407 issued to N. DiSanti and F. Oster on Feb. 26, 1976, in which a single data carrier is employed in a 100 Hz band centered at 2900 Hz. The data rate achieved in this case is 250 bps with indications that 500 bps is possible with a doubling of the data bandwidth to 200 Hz. This low data rate is a consequence of the inability to utilize a broader sub-band with a single carrier modulation scheme, since such a broader band would be subject to frequency dependent attenuation and group delay (BSTJ Vol. 63, No. 9, pp. 2059–2119), and single carrier modulation is sensitive to such impairments.

A third approach in the prior art is that disclosed in U.S. Pat. No. 4,546,212, issued to J. Crowder, Sr., on Oct. 8, 1985, for use over the public telephone network in which two sub-bands are proposed, 0–800 Hz for speech, and 800 Hz and above for data. The disadvantages of this scheme are first, that the speech quality is very poor due to the severely limited bandwidth allowed for voice transmission, and second, that a switching means must be employed to allow full bandwidth access in order that DTMF (dual tone multi-frequency) call signalling tones (which spans the 800 Hz limits) will be possible.

OBJECTS OF THE INVENTION

In view of the foregoing known difficulties wit simultaneous speech and data transmission using frequency division multiplexing techniques, it is an object of the present invention to provide an apparatus and method for the simultaneous transmission of analog speech and data which provides superior performance over bandwidth restricted analog channels, or digital representations of such channels.

In this regard it is an object of the present invention to provide a means for determining the total bandwidth available for both speech and data transmission on such a bandwidth restricted analog channel.

It is a further object of the invention to provide a means for successful transmission of data, in one or both of two data sub-bands, where one sub-band borders the upper available channel band edge and the other borders the lower available channel band edge, in which sub-bands the common impairments of induced noise, attenuation, and group delay, may be present.

Another object of the present invention is to provide a means for each user to obtain an optimized combination of speech quality and data throughput, in accordance with that user's preferences At one limit, in which voice quality is the dominant user preference, an object of the present invention is the provision of a mechanism for preselection of the voice sub-band. At the other limit, in which data rate is the overriding user preference, an object of the present invention is the provision of a mechanism for user selection of the data rate. In this situation the speech and data multiplexor will determine the width of the data sub-band or sub-bands required to sustain the requested data rate. Inside these two limits, it is an object of the present invention to provide a mechanism for notification of the speech and data multiplexor of the user's relative weighting of voice quality and data rate, and to provide a mechanism through which the speech and data multiplexor will respond to this information in the allocation of the voice sub-band.

Yet another object of the invention is to provide, without band switching, in that case in which the analog channel is a public switched telephone network circuit, unimpaired transmission of all normal telephone network signalling.

Another object of the invention is to provide, in a selected embodiment, means for detection of speech call placement, and in the circumstance in which no call is present, means to automatically switch to data transmission over the entire available frequency band.

It is yet another object of the present invention to provide embodiments in which the bandwidth restricted analog channel may be, in one case, a loaded (or unloaded) local telephone loop between a subscriber station and the telephone central office, and in a separate case, a general public switched telephone network circuit. In the latter case it is an object of the present invention to include as the bandwidth restricted analog channel, the digital representations of such channels, for example by pulse code modulation (PCM) or adaptive differential pulse code modulation (ADPCM), that are present within the public switched telephone network.

SUMMARY OF THE INVENTION

The present invention provides the foregoing improvements in the following manner.

The speech and data multiplexor transmission environment is comprised of a pair of multiplexor units, which may be denoted local and remote, connected by the analog transmission channel. Each multiplexor has in addition to the port for connection to the channel, two additional ports, one for speech, and one for data.

In the embodiment in which the analog channel is a public switched telephone network circuit, both local and remote units are identical and are denoted as subscriber units.

In the embodiment in which the analog channel is a loaded (or unloaded) local loop, the remote unit is located in the telephone company central office and is denoted as a central office unit. In this case the data port is connected to a telephone company data service unit, and the speech port is connected to the telephone company voice switch, and there are minor signal sensing and replication differences between subscriber and central office units that will be discussed in detail below.

Each speech and data multiplexor itself is comprised, within a single unit, of three basic functional components.

The first component is a multi-carrier, multi-mode, ensemble modem as disclosed in U.S. patent application Ser. No. 06-736,200 filed May 20, 1985 entitled "Ensemble Modem Structure for Imperfect Transmission Media" and which is assigned to the same assignee as the assignee of the present invention. The application serial number 06-736,200 is incorporated by reference in this application in accordance with the provisions of section 608.01(p) of the Manual of Patent Examining Procedure of the U.S. Patent and Trademark Office. As described in detail in application Ser. No. 06-736,200, this component provides the ability to separately determine the response of the analog channel to the transmission of 512 possible signal carriers, uniformly spaced 7.8125 Hz apart, across the frequency range from zero to 4000 Hz. This ability provides the mechanism for the determination by the speech and data multiplexors of the available analog channel bandwidth. Further, the ensemble modem has the ability to optimally allocate its allowable-transmission power in such a way as to choose carriers, and the modulation scheme employed on each, so that the overall data rate achieved is maximized. This selection procedure is based on the background noise and transmission loss experienced by each carrier and hence will adapt to induced power equipment noise in the low frequency sub-band, if such a band was selected for transmission. The carrier by carrier demodulation of the ensemble modem permits additional compensation for frequency dependent attenuation in both low and high frequency sub-bands. Finally the long symbol period modulation with its associated guardtime makes the transmission insensitive to frequency dependent group delay. Together these characteristics of the ensemble modem provide the superior performance, with respect to data transmission, of the present invention.

The second basic component of the speech and data multiplexor is comprised of the speech and channel port interfaces and the voice and data band pass filters. The speech and channel port interfaces are standard hybrid circuits as employed in the telephone industry. The filter stages determine the location of the lower edge and the upper edge of the voice sub-band. (In embodiments in which only one data sub-band is present there is only one voice frequency limit to be determined.) Their purpose is, upon transmission and reception, to separate the voice and data energy, to insure no data transmission interference with speech reception and vice-versa. In a selected embodiment these filter edges may be controlled by the user through the data port, providing the ability to select the sub-band for speech transmission.

The final basic component of the speech and data multiplexor is comprised of those circuit components required to ensure that no impairment is made to those signals that would be present in the circumstance in which the analog transmission channel in use is a standard public switched telephone network circuit. These circuit components are designed to detect for a subscriber unit, at the speech port (which in this circumstance is a telephone port), on and off hook states, and to detect at the channel port, ringing voltage and loop battery. They are also designed to then reproduce, at the telephone port, loop battery and ringing voltage, and, at the channel port, the on and off hook states. (For the embodiment in which a central office unit is present, the ports at which all detection and reproduction functions take place are reversed). This last basic functional component also provides the ability, through the off-hook detection circuit, to determine if a voice call is not in progress, and hence the ability to automatically notify the ensemble modem component when the full bandwidth is available for data transmission.

Speech and data multiplexor apparatus and methods which incorporate the structure and features described above and which are effective to function as described above constitute further, specific objects of this invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

The invention will be understood from the following detailed description when read with reference to the drawings in which:

FIG. 5 is a diagram illustrative of the analog channel frequency band division for the preferred embodiment in which data sub-band above the voice sub-band is employed.

FIG. 6. is a diagram illustrative of the analog channel frequency band division for the preferred embodiment in which data sub-band below the voice sub-band is employed.

DETAILED DESCRIPTION OF THE PREFERRED EMBODIMENTS

Figure 1:
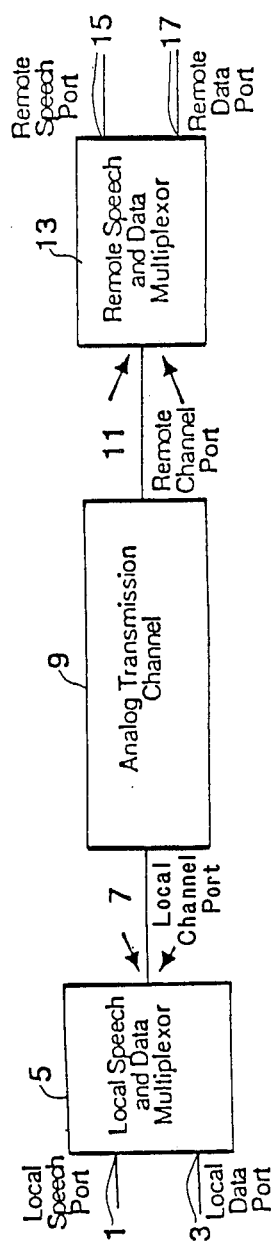
FIG. 1 is a generalized block diagram of the environment in which the invention is to be employed.

FIG. 1 is a generalized block diagram of the environment in which the present invention is employed.

In this environment there are three major components. These three components are a local speech and data multiplexor 5, an analog transmission channel 9 and a remote speech and data multiplexor 13.

Each data multiplexor has three communication ports. The local speech and data multiplexor 5 has a local speech port 1, a local data port 3 and a local channel port 7.

The remote speech and data multiplexor 13 has a remote speech port 15, a remote data port 17 and a remote channel port 11.

The analog transmission channel 9 is a channel which is impaired and bandwidth restricted.

In the operation of the system shown in FIG. 1, the speech input and the data input are multiplexed through the local speech and data multiplexor 5 and are output through the channel port 7 for transmission over the transmission channel 9. The transmission is received at the remote channel port 11 and is demultiplexed by the remote speech and data multiplexor 13, with the speech output delivered to remote speech port 15 and the data output delivered to the remote data port 17.

Conversely, speech and data are input to the remote speech and data multiplexor 13 for transmission over the analog channel 9 to the local speech and data multiplexor 5.

The operation of the local and the remote speech and data multiplexors 5 and 13 will now be described in more detail, with reference to FIG. 8.

Figure 7A:
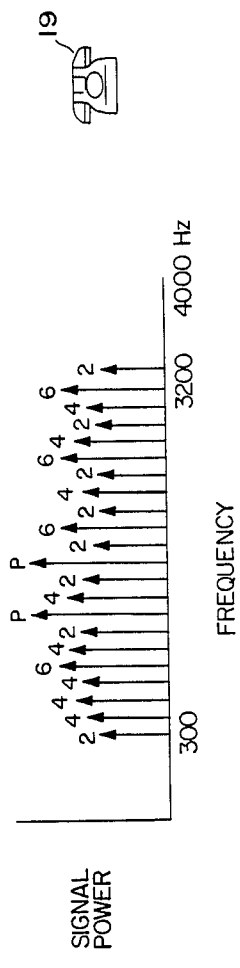
FIG. 7 is a diagram illustrative of the analog channel frequency band division for the preferred embodiment in which a data sub-band above the voice sub-band is employed, and in which automatic switching to full bandwidth data transmission is made in the absence of a speech connection.
Figure 7B:
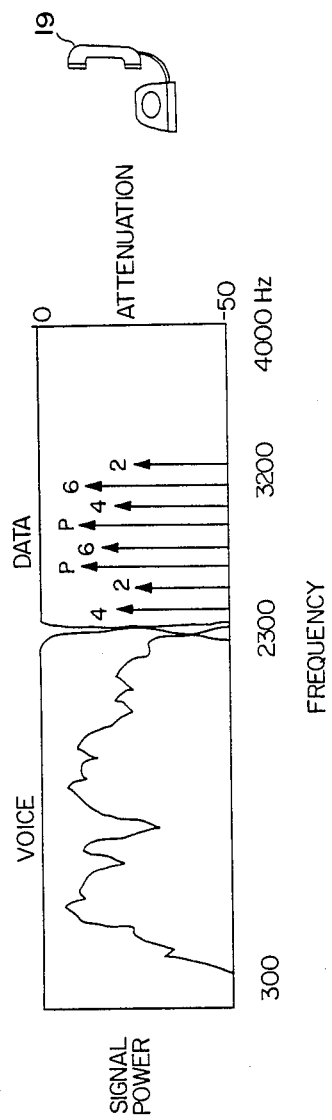

For purposes of illustration several components have been shown as physically incorporated within the local speech and data multiplexor 5, but it should be noted that these components are only present in the case in which the analog transmission channel is a local loop telephone analog channel or a public switched telephone network analog channel. These components are an on/off hook detector 42 a battery replicator 41, a battery detector 39, an on/off hook replicator 45, and a ring detect/bypass circuit 47. In addition, the information link 51 which extends from the on/off hook detector 42 to the ensemble modem 49 will not be present except in the preferred embodiment whose functionality is illustrated in FIG. 7.

The two-to-four wire interface units 27 and 29 are standard hybrid circuits as employed in telephone industry equipment and serve the purpose of separating the transmit and receive paths of the speech port 1 and the channel port 7. These interfaces separate the bidirectional paths into the transmit path 55 and the receive path 57.

Figure 8:
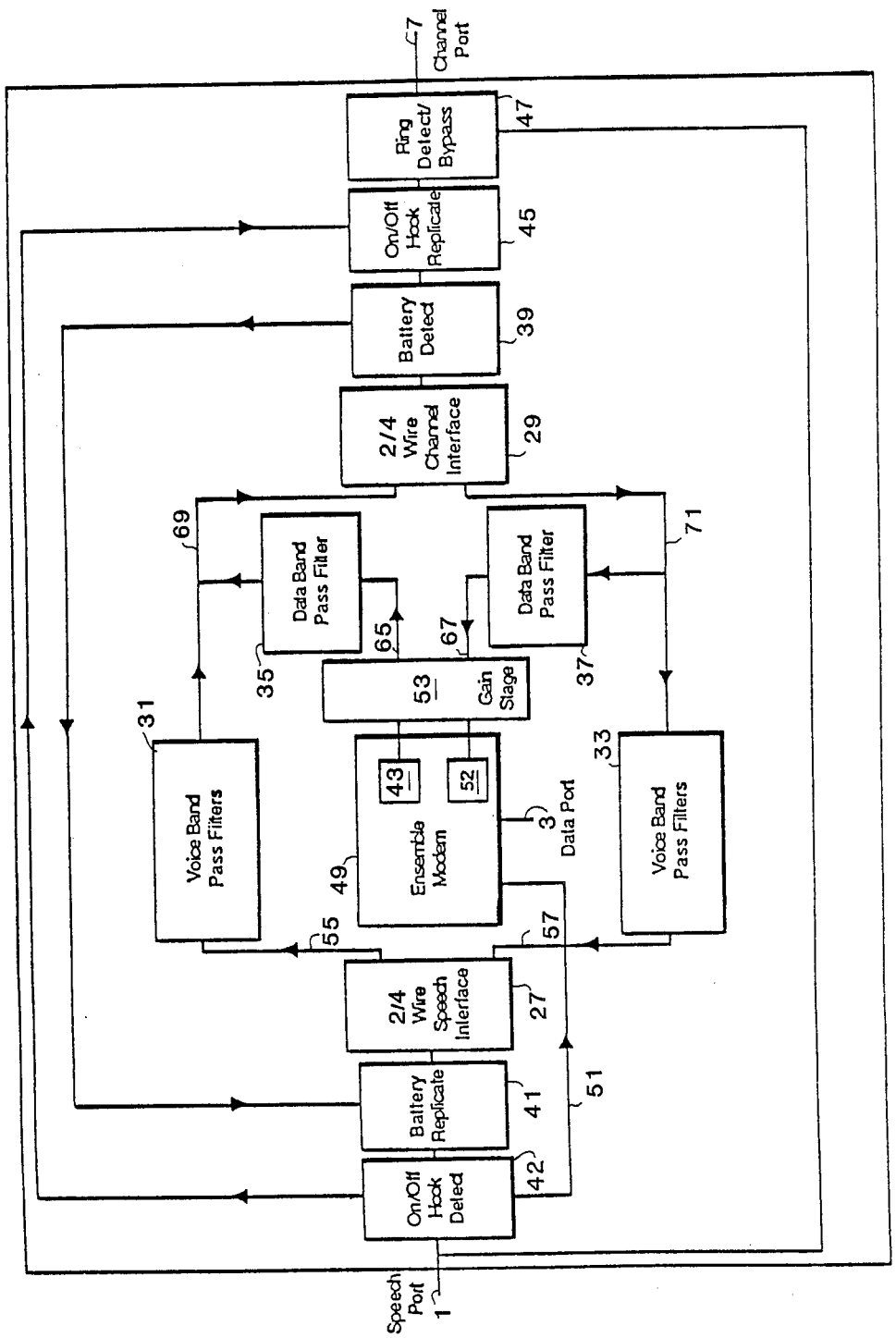
FIG. 8 is a block diagram of a local speech and data multiplexor.

The speech and data multiplexor 5 shown in FIG. 8 includes an ensemble modem as illustrated and disclosed in pending U.S. patent application Ser. No. 06-736,200 filed May 20, 1985 entitled "Ensemble Modem Structure for Imperfect Transmission Media" and assigned to the same assignee as the assignee of the present invention. This application Ser. No. 06-736,200, as noted above, is incorporated in this application by reference in accordance with the provisions of section 608.01(p) of the *Manual of Patent Examining Procedure* of the U.S. Patent and Trademark Office.

Figure 3:
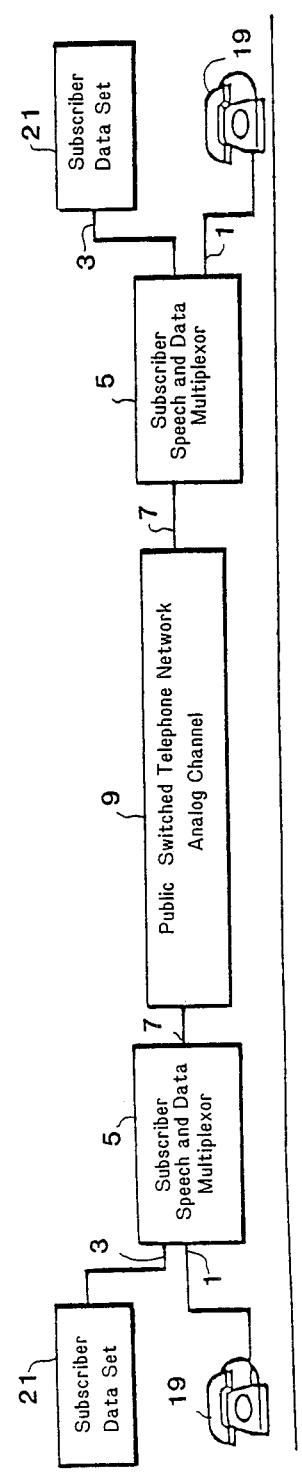
FIG. 3 is a block diagram of a preferred embodiment in which the analog channel is a public switched telephone network circuit.

The functionality of the interface 46 of the ensemble modem 26 shown in FIG. 3 of the referenced pending application Ser. No. 06-736,200 corresponds to the combined functionality of the gain stage 53 and the two-to-four wire channel interface 29 of FIG. 8 of this application.

The ensemble modem 49 in conjunction with the interfaces 53 and 29 of FIG. 8 of this application correspond to the entire ensemble modem 26 of FIG. 3 of the pending application Ser. No. 06-736,200.

The digital to analog converter 43 of FIG. 8 is the same digital to analog converter 43 of FIG. 3 of the pending application Ser. No. 06-736,200, and the analog to digital converter 52 is the same converter 52 of pending application Ser. No. 06-736,200.

The modulation scheme employed by the ensemble modem 49 is described in detail in pending application Ser. No. 06-736,200, however, for incorporation into the present invention, certain algorithm modifications must be made, which are now described.

The ensemble modem component 49 must be directed, either by instructions stored in program ROM or RAM, or through user input from the data port 3, of the user voice quality and data rate preferences. Based on these instructions or input, the multiplexor determines the voice and data sub-bands in a fashion described in detail below. During data transmission the ensemble modem has the capability to use 512 carriers, spaced 7.8125 Hz apart from zero to 4000 Hz, and those carriers within the selected voice sub-band must now be eliminated from the modulation process. This substantially prevents the ensemble modem from adding energy resident within the voice sub-band to the data transmit path 65. Any energy components in this voice sub-band that are introduced by signal changes during symbol transitions are then removed by the data band pass filters 35.

The ensemble modem utilizes two special carriers, called pilots, whose preferred locations are approximately 1450 Hz and 1700 Hz. In the present invention these pilots must be moved to either the lower or upper data sub-band, and, depending on the available width and transmission quality of these bands, the pilot frequency separation may require reduction.

During the training sequence the ensemble modem measures the background noise present at each carrier frequency and the attenuation suffered by each carrier. Based on this information, the ensemble modem computes the modulation scheme (for example 2, 4, or 6 bits) and power allocated to each available carrier, in accordance with the waterfill algorithm as described in pending application Ser. No. 06-736,200. In the present invention this procedure plays an even more important role than it does in full bandwidth transmission. This is because in the full bandwidth situation the central portion of the available band is usually unimpaired, and power and bits per carrier allocations are quite uniform as a result, whereas the sub-bands employed in the present invention, lying on the fringes of a restricted channel, usually suffer significant impairment. In addition, the full bandwidth situation often sees all available power expended on carriers in the central band, while in the present invention with only fringe bands available for use, the training sequence provides a more detailed determination of the total bandwidth available on a restricted channel.

In order to provide a means for responding to user preferences with respect to voice quality and data rate, the training sequence for the ensemble modem must be enhanced in several ways. The user preference information is stored in internal data memory after being input through the multiplexor data port.

It is possible to allow the preference instructions contained in either the originating or the answering multiplexor to control the sub-band selections, but for this description we assume control to reside with the originating modem which is further assumed to be the local speech and data multiplexor. At call origination, the orignating modem will determine by inspection of internal data memory whether the answering modem will respond in accordance with the local user's preference information. When this is the case, the training sequence performed depends on the remaining stored user preference information. In the situation where the user requests a particular voice sub-band, training is performed outside this sub-band in the normal fashion. If the user has requested a particular data rate, a series of training sequences is performed, beginning with a voice sub-band selection obtained from an internal table relating expected data rates and voice sub-bands. Training is repeated with larger or smaller voice sub-bands in pre-determined increments, until a data rate equal to the selected data rate, to within a user specified tolerance, is achieved, or until all the bandwidth available, or in the case that the analog channel is a public switched telephone network channel, all the bandwidth available consistent with the unimpaired transmission of all telephone network signalling has been allocated without the requested data rate having been achieved. In the latter case, the user is requested through the multiplexor data port, to resubmit a data rate request.

The final case is that in which the user has supplied his relative preference for voice quality and data rate through input of a single value within a predetermined range. (For example, an integer between zero and ten with larger integers indicating voice quality preference over data rate.) In this case, training is performed outside a voice sub-band determined by inspection of an internal data table relating preference values and voice sub-bands.

If the remote multiplexor is not known to have the local user's preference information, the two ensemble modems will train over a fixed, narrow sub-band above a fixed, wide voice sub-band and the local user's preference information will be transferred to the remote multiplexor. At this point the two multiplexors will initiate a new training sequence as described above. In all cases, when training is complete, data transmission may begin.

It is noted that in the preferred embodiment in which a transition to full bandwidth data transmission in the absence of voice communication is effected, it is necessary to re-initiate training, as well as to reposition pilot carriers after each transition, in order to optimally allocate the data transmission capacity in each case.

Finally we indicate that in preferred embodiments in which the voice sub-band (and hence the data sub-band edge or edges) is not variable, that a reduction in the processing requirements of th ensemble modem is possible. For example, if a single fixed data sub-band above the voice sub-band were to be used it would be appropriate to alter the sample rates of the analog to digital converter 43 and the digital to analog converter 52 illustrated in FIG. 8. The purpose of this alteration would be upon transmission to generate a fundamental frequency sub-band of width suitable for the data transmission, with frequency aliased copies of this sub-band then also present in the transmit path 65. The data band pass filter stage would be designed to remove all but a selected one of these replicated sub-bands, with the remaining selected sub-band carrying the modulated data for transmission. At the receiving multiplexor, after passage through the data band pass filter stage 37, the signal would be multiplied in the gain stage 53 by a single frequency tone centered Within the data sub-band and the result presented to the analog to digital converter 52, which would operate at the lowest sample rate sufficient to recover the modulated data carriers. As an example of the reduced processing this approach would allow, we consider a 64 point complex inverse Fast Fourier Transform to be presented to a digital to analog converter that is chosen to operate at a 1600 Hz sample rate. This would produce an 80 millisecond packet with carrier spacing of 12.50 Hz. With the NlogN estimate of FFT processing requirements this would produce a per packet processing reduction of 12 times over a full 512 point FFT, and only 64 carriers would be modulated with data.

The speech and data multiplexor 5 shown in FIG. 8 multiplexes speech and data in a manner that will now be described.

The transmit speech signal received at speech port 1 is directed through the speech interface 27 onto the speech transmit path 55.

The speech energy is filtered through the voice band pass filtering stage 31 to remove all speech energy in those sub-bands that have been pre-selected for data transmission.

The data enters the ensemble modem through data port 3, and this data is modulated by said modem and placed on the data transmit path 65. This signal then passes through the data band filtering stage 35 in which all data energy present in the preselected voice frequency sub-band is removed. Both voice and data signals are now present on the signal path 69 and are converted for transmission over the analog channel by the two-to-four wire interface 29 and are output through the channel port 7.

After transmission through the analog channel 9 the composite voice and data signal is received at the remote channel port 11 of the remote speech and data multiplexor 13 (see FIG. 1). As noted above, the port 11 of the multiplexor 13 corresponds in function to the port 7 of the multiplexor 5 in FIG. 1. Since the components to be described of the remote speech and data multiplexor 13 are common to the local speech and data multiplexor 5, reference will continue to be made to FIG. 8. In this regard the composite data signal is then converted by the two-to-four wire interface 29 and is placed on the receive path 71. This composite signal is then processed by two filter stages. In the first case, the signal is processed by the data band filter stage 37 to remove from the signal all energy present within the voice sub-band frequency; and the resulting signal (containing only frequencies within the data sub-band or sub-bands) is then presented to the data receive path 67 for processing by the ensemble modem 49. The modem demodulates the receive signal and transmits the data to the data port 3.

Similarly, the composite signal is processed by the voice band pass filter stage 33 to remove those frequency components in the signal residing outside the preselected voice sub-band. After such processing, the voice signal is presented to the receive path 57 for conversion by the two-to-four wire speech interface 27 and presentation to the speech port 1.

In accordance with the present invention all filter stages 31, 33, 35 and 37 interface with the ensemble modem 49 and allow the ensemble modem to determine the edge frequencies of the sub-bands to be employed for voice and data transmission. This interface is accomplished by control lines between the ensemble modem and the various filter stages, and for simplicity, these control lines have not been included in FIG. 8.

In a preferred embodiment as illustrated in FIG. 3, the previously mentioned sensing and signalling components 39, 41, 43, 45, 47 and 51 are present. The function and operation of these components will now be described.

In the environment illustrated in FIG. 3, both local and remote speech ports interface with telephone sets 19. With additional reference to FIG. 8 the on/off hook detector 42 is designed to sense the on or off hook states of the telephone sets 19 and to present this status information to the ensemble modem 49 through the information path 51. In addition this information is presented to the on/off hook replicator circuit 45 which circuit reproduces the state presented to it. The basic purpose of these components is to present to the channel port 7 the same on or off hook state that is presented to the speech port 1. Further, the circuits 42 and 45 serve the purpose of replicating pulse dialing signals as presented at speech port 1 since such pulse dialing signals are merely timed transitions between on and off hook states.

In the same fashion, the battery detector circuit 39 detects the presence of battery voltage presented at the channel port 7 and transmits this information to the battery replicator circuit 41. This circuit 41 then reproduces battery voltage at the speech port 1 whenever such voltage as detected by circuit 39 is present at channel port 7. The circuit 41 in this way provides the loop current to power the telephone set 19 in its off-hook state whenever such loop current is present at the channel port 7.

In addition, the circuits 39 and 43 perform the function of reproducing such telephone company signalling as is termed forward flash. This signaling is a telephone company initiated timed switch between battery present at channel port 7 and no battery present at that port The ring detector circuit 47 is designed to detect the presence of ring voltage at the channel interface port 7. Upon detecting the presence of ring voltage, this circuit actuates a relay which effects a direct connection of the channel port 7 and the speech port 1. The purpose of this operation is to avoid damage to the speech and data multiplexor as a result of the presence of the large ring voltage. Upon ring trip or other discontinuance of the ring signal, the ring detector circuit 47 returns the speech and data multiplexor to its normal state.

Figure 2:
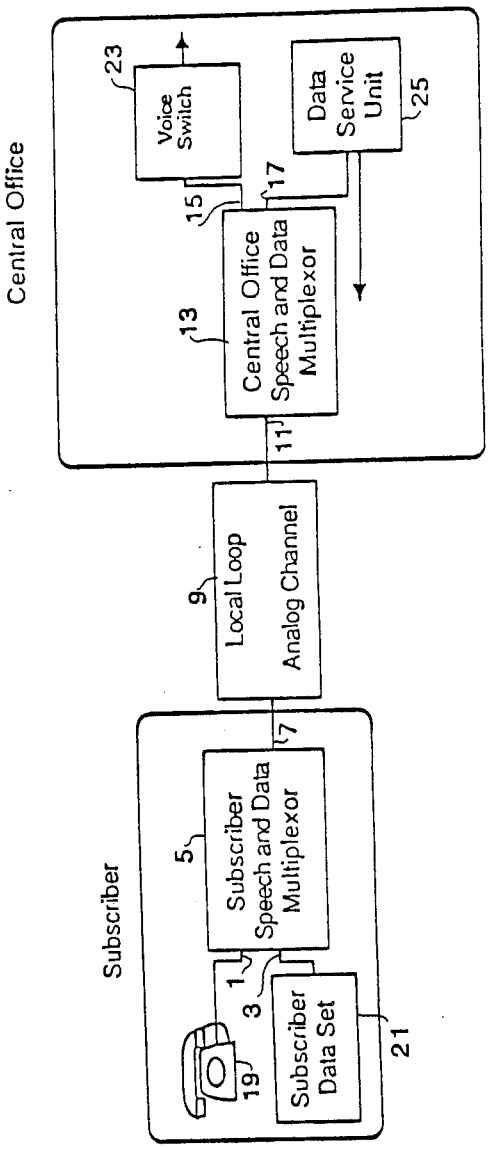
FIG. 2 is a block diagram of a preferred embodiment in which the analog channel is a telephone company local loop.

With reference to FIG. 2, illustration is made of the environment in which the analog transmission channel 9 is a local loaded or unloaded twisted pair telephone loop. In this embodiment, the remote speech and data multiplexor 13 is located in a telephone company central office and is designated as a central office speech and data multiplexor 13 in FIG. 2.

As mentioned previously, those ports at which the telephone detection and reproduction functions are performed are reversed from the case of a subscriber speech and data multiplexor. This situation may be realized with reference to FIG. 8 with the central office remote multiplexor 13 replacing the local multiplexor 5 and with the following correspondence being made: port 11 replacing port 7; port 15 replacing port 1; and port 17 replacing port 3. The reason for this replacement is that in the case of central office placement of a speech and data multiplexor, battery detection must take place at speech port 15 with such battery replication required at channel port 11.

In the same fashion the remaining telephone signalling functions are carried out at port locations 15 and 11 in their correspondence with port locations 1 and 7 respectively, as previously described with reference to a local speech and data multiplexor.

The only additional distinction between central office and subscriber speech and data multiplexors is that the battery replicator circuit 41 of a central office speech and data multiplexor 13 replicates central office battery voltage (typically forty-eight volts) for supply to the local telephone loop 9, whereas the battery replicator circuit 41 in a subscriber speech and data multiplexor 5 will replicate battery for supply to the telephone handset 21 (typically 24 volts).

In the central office environment the data port 17 presents and receives the transmitted and received data through a data service unit 25 as supplied by the telephone company. The transmission and reception beyond this data service unit 25 will take place in a fashion as determined by the telephone company.

Figure 9:
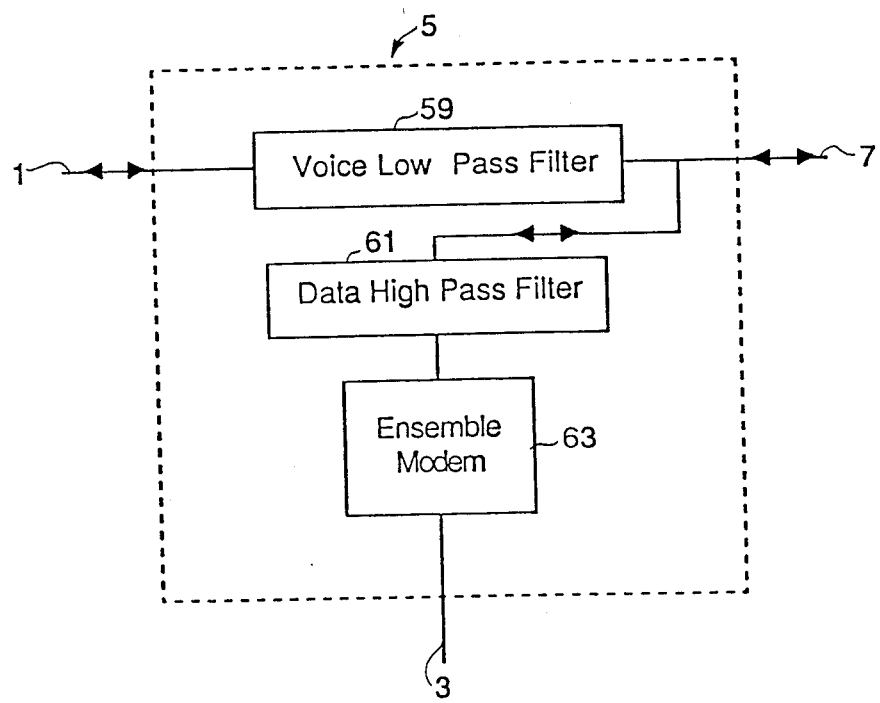
FIG. 9 is a block diagram of the simplified architecture of the preferred embodiment in which a fixed data sub-band above the voice sub-band is employed, and in which no switching to full bandwidth data transmission is possible.

FIG. 9 illustrates an embodiment in which a simplified architecture is employed. In this architecture a subscriber speech and data multiplexor 5 communicates through the speech port 1 and the channel port 7 by means of a passive bidirectional voice filter 59. This filtering stage is designed for that case in which only a single data sub-band above the voice is present. In this instance, a separate passive bidirectional filter stage 61 is employed to separate the data sub-band frequencies from the voice sub-band frequencies. The benefit of this architecture is primarily cost reduction. This occurs as a result of the elimination of all telephone signalling sensing and replication circuits present and illustrated in FIG. 8. This elimination is possible since the passive low pass filter stage 59 is transparent to all these sensing and signalling functions. In this architecture the ensemble modem 63 is precisely the ensemble modem 26 as previously referred to in FIG. 3 of the referenced applicaton Ser. No. 06/736,200. In the simplest implementation of this embodiment the selection of the voice and data sub-band separation frequency would not be programmable by the ensemble modem 49 shown in FIG. 8 of the present applicaiton. However, an alternate implementation would include multiple circuit components within the bi-directional filter stage 59 of FIG. 9, and control lines between this stage and the ensemble modem 63 allowing the selection of filter components, and hence the selection of the voice and data sub-band separation frequency.

Figure 4:
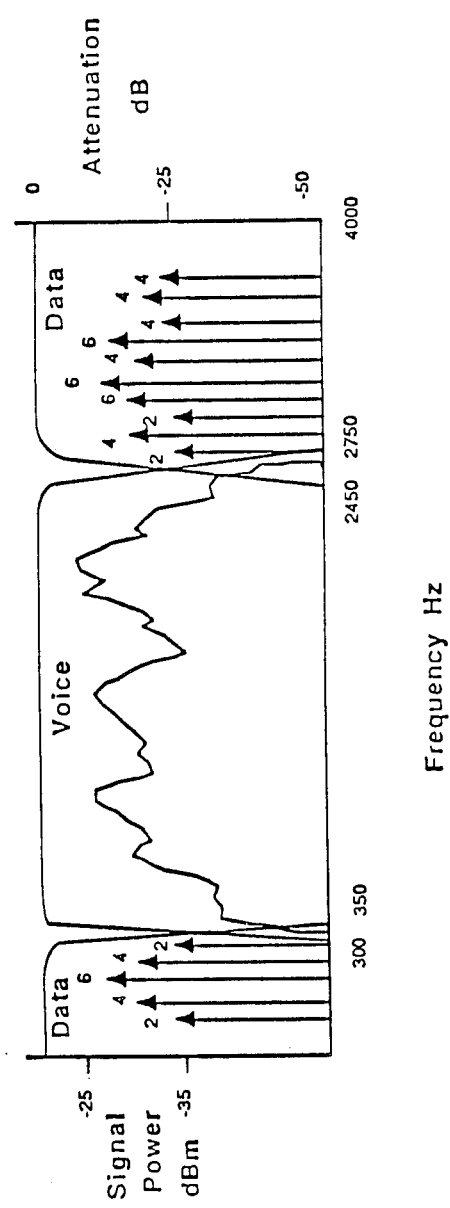
FIG. 4 is a diagram illustrative of the analog channel frequency band division for the preferred embodiment in which data sub-bands around the voice sub-band are employed.

FIGS. 4, 5, and 6 indicate schematically the frequency band subdivision employed in preferred embodiments of the present invention. In each case, indication is made of the frequency sub-band (or sub-bands) used for data transmission and the frequency sub-band allocated for voice transmission.

In each of FIGS. 4, 5, and 6 a plot is made of signal power versus frequency as well as a plot of attenuation versus frequency in order to illustrate the filter roll-off characteristics employed for each of the voice band and data band filtering stages. Also indicated are the multiple carriers used for data transmission in each case as well as examples of the powers assigned to each carrier and the number of bits assigned to each carrier per symbol period.

Although the frequency sub-bands in the preferred embodiments may be varied, the particular choices illustrated in FIGS. 4-6 have the benefit of providing good voice transmission quality in all cases.

In addition, in those environments in which the analog transmission channel is a local telephone loop or a public switched telephone network circuit, call placement telephone signalling is required. In this instance the utilization of DTMF (dual tone multifrequency) and call progress signalling requires transmission of frequencies within the range 350–1500 Hertz. In all of the cases indicated in FIGS. 4-6, the sub-band allocated for voice transmission is adequate to transmit without impairment these call placement signals. Thus, in all cases illustrated in FIGS. 4-6, no band switching during call placement is required, since the sub-band allocated for voice transmission in these instances is sufficient to transmit all telephone signals without impairment.

Data transmission in the sub-band above the voice is the only choice available in the parallel architecture embodiment illustrated in FIG. 9. This embodiment is particularly well suited to the case in which the analog channel is a long distance public switched telephone connection since frequencies below 300 Hertz are considerably attenuated on such channels and hence transmission in a sub-band below the voice is generally unsatisfactory.

On the other hand, in the embodiment illustrated in FIG. 2, in which the transmission channel is the local loop telephone circuit, there is no restriction on the lowest frequency available for transmission; and in this environment a data sub-band below voice, either alone or in conjunction with the data sub-band above voice, is well suited for data transmission.

FIG. 7 is illustrative of the embodiment in which the option of full bandwidth data transmission is present in the absence of speech. This option is available in all embodiments of the present invention and may be effected through the on/off hook detect circuitry 43 as illustrated in FIG. 8.

The telephone set 19 illustrated diagrammatically at the right-hand side of the top of FIG. 7 and at the right-hand side of the bottom of FIG. 7 illustrates the respective on-hook (absence of speech) and off-hook (presence of speech) telephone conditions. When the telephone is on hook the entire telephone band is available and is shown in the top part of FIG. 7 as being used for the transmission of data. The lower part of FIG. 7 shows the off hook telephone for the simultaneous transmission of speech and data, and in this instance the data is restricted to a sub-band in the upper edge of the available channel.

While simultaneous transmission of data in an upper sub-band only is illustrated in the lower part of FIG. 7, the data could also be transmitted around the voice as illustrated in FIG. 4, or below the voice as illustrated in FIG. 6, in alternate preferred embodiments.

EXAMPLE 1

By way of example, a description is made of a specific embodiment of the present invention suitable for use over loaded local loops as indicated in FIG. 2. In this example the multiplexors 5 and 13 utilize the lower and upper edges of the nominal 0–4000 Hz telephone channel for the transmission of data with the central portion of the band reserved for voice as shown in FIG. 4.

In the evaluation of the upper edge of the upper data band, it is to be expected that the attenuation rolloff on loaded loops will prevent transmission beyond approximately 3600 Hz, 3500 Hz, and 3400 Hz, for loops 20,000 ft., 30,000 ft., and 40,000 ft. in length, respectively. The lower edge of the upper data band is programmable by the ensemble modem 49 (see FIG. 8) in approximately 100 Hz steps, with this example setting being 2700 Hz. The upper edge of the low data band is also programmable, but in approximately 50 Hz steps, with the example setting being 300 Hz.

After allowing for filter transition regions the voice sub-band utilized by this example embodiment is between 350 Hz and 2450 Hz.

In evaluating the loop transmission characteristics the multiplexors 5 and 13 of FIG. 2 exchange information regarding these characteristics during a training phase. This information consists of the attenuation and background noise experienced by each of the carriers (which carriers are separated by 7.8125 Hz) transmitted within the data sub-bands. Based on this information, the multiplexors 5 and 13 allocate power to each carrier in such a fashion as to maximize data throughput. One consequence of this process is the determination of the number of bits modulated onto each carrier, selected from the choices of 6, 4, 2, or 0 (i.e. unused).

The net result of the line monitoring process is that the data rate achieved depends upon the local loop characteristics. Further, the number of packets received in error is constantly monitored; and when a programmable threshold is exceeded, the training process is repeated. Hence the data rate achieved will shift whenever the background line noise or other transmission characteristic is varied.

The multiplexors 5 and 13 employ a packet protocol very similar to HDLC (high level data link control). The packet size is determined by the number of carriers and the bits per carrier employed on a given connection. Each packet consists of a header, a data portion, and a 16 bit CRC (cyclic redundancy check). Contained within the header is a sequence number that is referenced to a sliding window. The CRC is used to detect flawed packets; and, based on the sequence identifier, a request is made for re-transmission of these packets. This procedure guarantees error free data transmission over the local loop.

The multiplexors 5 and 13 buffer the data input and hence are aware of their individual transmission requirements at each moment in time. A protocol denoted Adaptive Duplex protocol is employed to allow the most efficient use of the line's capacity based on the quantity of data currently awaiting transmission. Essentially, packets are sent in only one direction at a time, and the number of packets sent by each multiplexor in a row, depends on the quantity of data stored in that multiplexor's buffers. Hence, in a "file transfer mode", with only a few characters in response, the allocation is typically twelve packets (the present choice) in one direction and single packet in the opposite direction.

The key benefit of the Adaptive Duplex protocol approach is that the full transmission capacity of the link is available at all times to respond to asymmetric data transmission requirements.

The multiplexors 5 and 13 are capable of transmission over unloaded loops at least in the range of 0–18,000 ft. in length. The multiplexors can also transmit over properly loaded loops at least in the range of 18,000–40,000 ft. in length. Further, the units can successfully transmit over a variety of improper plant configurations. (For example, improperly installed or positioned loading coils, bridged tap between loading coils, etc.).

There are two measures of data rate, the first of which is called the channel rate. This rate is computed by multiplying the number of bits per packet times the number of packets sent per second (approximately 7.35). As described above, this channel rate depends strongly on the local loop characteristics. As an example, however, the channel rate for a 30,000 ft. loaded loop with average background noise would be approximately 4,000 bits per second.

Since there is overhead due to the packet headers and the CRC's, as well as to the Adaptive Duplex protocol line turnaround procedure, a second throughput data rate measure discounted for these effects is more relevant. This overhead is a complex function of the packet size and the actual turnaround characteristics; however, a discount factor of 25% accurately represents the most common configuration. This results in an Adaptive Duplex protocol throughput rate of approximately 3,000 bps for the same 30,000 ft. loop.

The voice sub-band has been chosen so that all DTMF tones generated by the telephone, as well as signalling tones generated by the central office (dial tone, audible ringing tone, call waiting tone, confirmation tone, etc.) pass unimpaired through the multiplexors 5 and 13.

When a 20 Hz ringing signal is present on the line, relays are activated to allow this high voltage signal to bypass both the remote and central office units. During this bypass state no data communication is possible, but once the ring signal is removed, the units return to the line, and the packet protocol assures that no data has been lost.

The telephone interface of the remote multiplexor detects pulse dialing and repeats those pulses to the loop. The line interface of the central office unit detects these pulses after transmission through the loop and repeats them at the central office interface.

The telephone interface of the remote unit senses on and off hook and repeats these states at its line interface. The line interface of the central office unit in turn senses these states and repeats them at the central office unit interface.

The central office interface of the central office unit senses any forward disconnects (loss of battery) and repeats these states at its line interface. The line interface of the remote multiplexor in turn senses and repeats these states at its telephone interface.

With the previously described voice and data sub-band settings, it is possible to transmit data through the telephone interface of the remote multiplexor using a 300 bps Bell 103 compatible modem. Should the user wish to employ a Bell 212 compatible modem it would be necessary to reduce the high data channel bandwidth. This can be accomplished either through commands issued to the remote multiplexor data port or through the addition of a switch to the remote multiplexor unit. A data port command or switch closure will then cause both multiplexors to redefine the lower edge of the upper data band and to redeploy the available power over the reduced band. U.S. application Ser. No. 06-736,200, now U.S. Pat. No. 4,679,227 is incorporated by reference.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A speech and data multiplexor for use over imparied and bandwidth restricted analog channels or digital representative of such channels, said multiplexor comprising, allocating means for alllocating a speech sub-band in a central poriton of the available bandwidth for the transmission of speech, selecting means for selecting at least one data sub-band, within the available bandwidth and on a border of the speech sub-band and in a portion of the available bandwidth separate and distinct from the portion of the bandwidth containing the speech sub-band, for the transmission of data, said analog channel being an analog channel of the kind in which impairments of induced noise, attenuation and/or group delay are common in the data sub-band, and adaptive means for adapting the transmission of the data in the data sub-band to any impairments existing in the data sub-band and independent of any speech signals and/or channel impairments existing or occurring in the speech sub-band and effective to optimize the transmission of data in the data sub-band in the presence of said impairments in the data sub-band and within the limt of the power available or allocated for the transmission.

2. A speech and data multiplexor for use over impaired and bandwidth restricted analog channels or digital representatives of such channels, said multiplexor comprising, allocating mean for allocating a speed sub-band in a central portion of the available bandwidth for the transmission of speech, selecting means for selecting at least one data sub-band within the available bandwidth and on a border of the speech sub-band for the transmission of data, said analog channel being an analog channel of the kind in which impairments of induced noise, attenuation and/or group delay are common in the data sub-band, adaptive means for adapting the transmission of the data in the data sub-band to any impairments existing in the data sub-band and effective to optimize the transmission of data in the data sub-band in the presence of said impairments and within the limit of the power available or allocated for the transmission, and wherein the adaptive means include evaluating means for determination of the total available bandwith for data transmission, said evaluating means being operatively associated with the selecting means for said selection of the data sub-band.

3. A speech and data multiplexor for use over impaired and bandwidth restrited analog channels or digital representatives of such channels, said multiplexor comprising, allocating means for allocating a speech sub-band in a central portion of the available bandwidth for the transmission of speech, selecting means for selecting at least one data sub-band within the available bandwidth and on a border of the speech sub-band for the transmission of data, said analog channel being an analog channel of the kind in which impairments of induced noise, attenuation and/or group delay are common in the data sub-band, adaptive means for adapting the transmission of the data in the data sub-band to any impairments existing in the data sub-band and effective to optimize the transmission of data in the data sub-band in the presence of said impairments and within the limit of the power available or allocated for the transmission, and wherein the adaptive means include multiple signal carriers uniformly spaced apart in small increments of frequency and wherein said adaptive means are effective both to select certain carriers for transmitting the data and also to select a particular modulation scheme for each selected carrier in order to optimize the overall rate of data transmission in the presence of any impairments existing in the data sub-band.

4. A speech and data multiplexor for use over impaired and bandwidth restricted analog channels or digital representatives of such channels, said multiplexor comprising, allocating means for allocating a speech sub-band in a central portion of the available bandwidth for the transmission of speech, selecting means for selecting at least one data sub-band within the available bandwidth and on a border of the speech sub-band for the transmission of data, said analog channel being an analog channel of the kind in which impairments of induced noise, attenuation and/or group delay are common in the data sub-band, adaptive means for adapting the transmission of the data in the data sub-band to any impairments existing in the data sub-band and effective to optimize the transmission of data in the data sub-band in the presence of said impairments and within the limit of the power available or allocated for the transmission, and wherein the adaptive means include an ensemble modem which utilizes multiple signal carriers and a multimode modulation scheme for transmitting the data in the data sub-band.

5. The invention defined in claim 4 wherein the multiple signal carriers are uniformly spaced apart in small increments of frequency and wherein the ensemble modem depolys the allowable available transmission power by choosing certain carriers for transmission for data and also by choosing a modulation scheme employed on each chosen carrier.

6. The invention defined in claim 5 wherein the selection of the signal carriers adapts to induced power and telephone equipment noise in a low frequency data sub-band, provides carrier by carrier demodulation to permit compensation for frequency dependent attenuation in both low and high frequency data sub-bands, and provides a long symbol period modulation with an associated guardtime to make the transmission of data insensitive to frequency dependent group delay.

7. The invention defined in claim 4 wherein the ensemble modem includes testing means for testing the analog channel transmission characteristics during a training phase to determine the attenuation and the background noise experienced by each of the carriers transmitted within the data sub-band and wherein the modem then optimizes the transmission of data by deploying the available power over selected carrier frequencies and with a modulated number of bits on each selected carrier to obtain the most efficient use of the data sub-band for the transmission of data in view of the existing analog channel transmission characteristics.

8. The invention defined in claim 1 wherein the allocating means permit user selection of the boundaries of the speech sub-band.

9. The invention defined in claim 8 wherein the multiplexor includes a data port and the user selection of the speech sub-band to be utilized is accomplished by means of information transmitted through the data port.

10. The invention defined in claim 1 including transmitting means for transmitting speech in the speech sub-band.

11. The invention defined in claim 1 including transmitting means for transmitting data in the speech sub-band.

12. The invention defined in claim 11 wherein the transmitting means include modem means for transmitting data through the use of a conventional data set, such as, for example, a 300BPS Bell 103 compatible data set or a 1200 BPS Bell 212 compatible data set.

13. The invention defined in claim 1 wherein the selecting means select a single data sub-band above the speech sub-band.

14. The invention defined in claim 1 wherein the selecting means select a single data sub-band below the speech sub-band.

15. The invention defined in claim 1 wherein the selecting means select two data sub-bands, one data sub-band above the speech sub-band and the other data sub-band below the speech sub-band.

16. A speech and data multiplexor for use over impaired and bandwidth restricted analog channels or digital representatives of such channels, said multiplexor comprising,
   allocating means for allocating a speech sub-band in a central portion of the available bandwith for the transmission of speech,
   selecting means for selecting at least one data sub-band within the available bandwidth and on a border of the speech sub-band for the transmission of data,
   said analog channel being an analog channel of the kind in which impairments of induced noise, attentuation and/or group delay are common in the data sub-band,
   adaptive means for adapting the transmisison of the data in the data sub-band to any impairments existing in the data sub-band and effective to optimize the transmission of data in the data sub-band in the presence of said impairments and within the limit of the power available or allocated for the transmission, and wherein the selecting means select a single data sub-band above the speech sub-band and including detecting means for detecting the absence of speech transmission on the analog channel and effective in combination with the selecting means for selecting all of the available bandwith for the transmission of data in the absence of speech.

17. A speech and data multiplexor for use over impaired and bandwidth restricted analog channels or digital representatives of such channels, said multiplexor comprising,
   allocating means for allocating a speech sub-band in a central portion of the available bandwith for the transmission of speech,
   selecting means for selecting at least one data sub-band within the available bandwidth and on a border of the speech sub-band for the transmission of data,
   said analog channel being an analog channel of the kind in which impairments of induced noise, attentuation and/or group delay are common in the data sub-band,
   adaptive means for adapting the transmission of the data in the data sub-band to any impairments existing in the data sub-band and effective to optimize the transmission of data in the data sub-band in the presence of said impairments and within the limit of the power available or allocated for the transmission, and wherein the selecting means select a single data sub-band below the speech sub-band and including detecting means for detecting the absence of speech transmission on the analog channel and effective in combination with the selecting means for selecting all of the available bandwidth for the transmission of data in the absence of speech.

18. A speech and data multiplexor for use over impaired and bandwidth restricted analog channels or digital representatives of such channels, said multiplexor comprising,
   allocating means or allocating a speech sub-band in a central portion for the available bandwidth for the transmission of speech,
   selecting means for selecting at least one data sub-band within the available bandwidth and on a border of the speech sub-band for the transmission of data,
   said analog channel being an analog channel of the kind in which impairments of induced noise, attentuation and/or group delay are common in the data sub-band,
   adaptive means for adapting the transmission of the data in the data sub-band to any impairments existing in the data sub-band and effective to optmize the transmission of data in the data sub-band in the presence of said impairments and within the limit of the power available or allocated for the transmission, and wherein the selecting means select two data sub-bands, one data sub-band above the speech sub-band and the other data sub-band below the speech sub-band and including detecting means for detecting the absence of speech transmission on the analog channel and effective in combination with the selecting means for selecting all of the available bandwidth for the transmission of data in the absence of speech.

19. The invention defined in claim 1 including separating means for separating the speech and data energies that are present in the speech sub-band and data sub-band.

20. The invention defined in claim 19 wherein the separating means include filter means.

21. The invention defined in claim 20 wherein the filter means include programmable, active filter means for selecting the edge frequencies of the sub-bands.

22. The invention defined in claim 21 wherein the multiplexor includes an ensemble modem operatively associated with the filter means for allowing the ensemble modem to select the edge frequencies of the sub-bands.

23. The invention defined in claim 20 wherein the filter means include passive bi-directional filters.

24. The invention defined in claim 1 wherein the analog channel is a telephone channel having a restricted bandwidth in the general range of 0–4000 Hz.

25. The invention defined in claim 24 wherein the speech sub-band is allocated in the frequency range of about 300 Hz to 2700 Hz.

26. A speech and data multiplexor for use over impaired and bandwidth restricted analog channels or digital representatives of such channels, said multiplexor comprising, allocating means for allocating a speech sub-band in a central portion of the available bandwidth for the transmission of speech, selecting means for selecting at least one data sub-band within the available bandwidth and on a border of the speech sub-band for the transmission of data, said analog channel being an analog channel of the kind in which impairments of induced noise, attenuation and/or group delay are common in the data sub-band, adaptive means for adapting the transmission of the data in the data sub-band to any impairments existing in the data sub-band and effective to optimize the transmisison of data in the data sub-band in the presence of said impairments and within the limit of the power available or allocated for the transmission, and wherein the analog channel is a telephone channel having a restricted bandwith in the general range of 0–4000 Hz and wherein the edges of the speech sub-band are allocated to permit all dual tone multi-frequency (DTMF) and call progress signalling without the need to switch the speech or data sub-bands.

27. The invention defined in claim 26 wherein the analog channel is a standard public-switched telephone network circuit and wherein the multiplexor includes circuit components which insure that no impairment is made to those signals that would normally be present on such telephone network circuits.

28. The invention defined in claim 24 wherein the multiplexor has three ports—a channel port, a speech port and a data port—and filtering means for separating speech and data energies that are present in the sub-bands and wherein the filter means are active programable filter means operatively associated with the data port for permitting user selection of the edges of the sub-bands to be employed by the multiplexor.

29. The invention defined in claim 24 wherein the analog channel is a public switched telephone network circuit, and a local multiplexor is used at one end of the circuit and a remote multiplexor is used at the other end of the circuit and both the local and remote multiplexors are identical.

30. The invention defined in claim 24 wherein the analog channel is a loaded (or unloaded) local loop, a local multiplexor is used at one end of the channel and a remote multiplexor is used at a telephone company central office.

31. A speech and data multiplexor for use over impaired and bandwidth restricted analog channels or digital representations of such channels, said multiplexor comprising, allocating means for allocating a speech sub-band in a cental portion of the available bandwidth for the transmission of speech, selecting means for selecting at least one data sub-band within the available bandwidth and on a border of the speech sub-band for the transmission of data, said analog channel being an analog channel of the kind in which impairments of induced noise, attenuation and/or group delay are common in the data sub-band, adaptive means for adapting the transmission of the data in the data sub-band to any impairments existing in the data sub-band and effective to optimize the transmission of data in the data sub-band in the presence of said impairments and within the limit of the power available or allocated for the transmission, said adaptive means including evaluating means for determination of the total available bandwidth for data transmission, said evaluating means being operatively associated with the selecting means for said selecting of the data sub-band, said adaptive means including an ensemble modem which utilizes multiple signal carriers and a multi-mode modulation scheme for transmitting the data in the data sub-band, filter means for separating the speech and data energies that are present in the speech sub-band and data sub-band, said filter means including programmable, active filter means for selecting the edge frequencies of the sub-bands, and wherein the ensemble modem is operatively associated with the filter means for allowing the ensemble modem to select the edge frequencies of the sub-bands, and wherein the analog channel is a telephone channel having a restricted bandwidth in the general range of 0–4000 Hz and the edges of the speech sub-band are allocated to permit all dual tone multi-frequency (DTMF) signalling without the need to switch the speech or data sub-bands.

32. A speech and data multiplexor for use over impaired and bandwidth restricted analog channels or digital representatives of such channels, said multiplexor comprising, allocating means for allocating a speech sub-band in a central portion of the available bandwidth for the transmission of speech, selecting means for selecting at least one data sub-band within the available bandwidth and on a border of the speech sub-band for the transmission of data, said analog channel being an analog channel of the kind in which impairments of induced noise, attentuation and/or group delay are common in the data sub-band, adaptive means for adapting the transmission of the data in the data sub-band to any impairments existing in the data sub-band and effective to optimize the transmission of data in the data sub-band in the presence of said impairments and within the limit of the power available or allocated for the transmission, and including user input means for inputting a requested speech quality signal, a requested data rate signal or a value indicating the relative user weighting of speech quality and data rate and wherein said allocating means and selecting means determine the edge frequencies of the speech and data sub-bands in response to the signal which is input by said user input means.

33. A speech and data multiplexor for use over impaired and bandwidth restricted analog channels or digital representatives of such channels, said multiplexor comprising,
    allocating means for allocating a speech sub-band in the middle part of the available bandwidth for the transmission of speech,
    selecting means for selecting at least one data sub-band within the available bandwidth and on a border of the speech sub-band for the transmission of data,
    said analog channel being an analog channel of the kind in which impairments of induced noise, attenuation and/or group delay are common in the data sub-band,
    elvaluating means for determination of the total available bandwidth for data transmission, said evaluating means being operatively associated with the selecting means for said selecting of the data sub-band, and
    multicarrier data transmitting means for transmitting data in the data sub-band on a plurality of carriers.

34. A method of multiplexing speech and data over impaired and bandwidth restricted analog channels or digital representations of such channels, said method comprising,
    allocating a speech sub-band in the middle part of the available bandwidth for the transmission of speech,
    selecting at least one data sub-band, within the available bandwidth and on a border of the speech sub-band and in a portion of the available bandwidth separate and distinct from the portion of the bandwidth containing the speech sub-band, for the transmission of data, and
    adapting the transmission of the data in the data sub-band to the impairments of induced noise and attenuation that may be present in the data sub-band and independently of any speech signals and/or channel impairments existing or occurring in the speech sub-band to optimize the transmission of data in the data sub-band in the presence of said impcirments in the data sub-band and within the limit of the power available or allocated for the transmission.

35. The invention defined in claim 34 wherein the adapting step includes evaluating the total available bandwidth for selecting said data sub-band.

36. A method of multiplexing speech and data over impaired and bandwidth restricted analog channels or digital representations of such channels, said method comprising,
    allocating a speech sub-band in the middle part of the available bandwidth for the transmission of speech,
    selecting at least one data sub-band within the available bandwidth and on a border of the speech sub-band for the the transmission of data,
    adapting the transmission of the data in the data sub-band to be impairments of induced noise and attenuation that may be present in the data sub-band to optimize the transmission of data in the data sub-band in the presence of said impairments and within the limit of the power available or allocated for the transmission, and including utilizing multiple signal carriers uniformly spaced apart in small increments of frequency for transmitting data in the data sub-band and including selecting certain carriers for the transmission of data and also selecting a particular modulation scheme for each selected carrier (to determine the number of data bits modulated on each carrier) for said optimization of the overall rate of data transmission in the presence of any impairments existing in the data sub-band.

37. A method of multiplexing speech and data over impaired and bandwidth restricted analog channels or digital representations of such channels, said method comprising,
    allocating a speech sub-band in the middle part of the available bandwidth for the transmission of speech,
    selecting at least one data sub-band within the available bandwidth and on a border of the speech sub-band for the the transmission of data,
    adapting the transmission of the data in the data sub-band to be impairments of induced noise and attenuation that may be present in the data sub-band to optimize the transmission of data in the data sub-band in the presence of said impairments and within the limit of the power available or allocated for the transmission, and including determining the edge frequencies of the speech and data sub-bands in response to a user requested speech quality, a user requested data rate or a value indicating the realtive user weighting of speech quality and data rate.

* * * * *